(12) United States Patent
Lin

(10) Patent No.: US 8,917,254 B2
(45) Date of Patent: Dec. 23, 2014

(54) TOUCH UNIT

(76) Inventor: Chih-Chung Lin, Taipei (TW)

( * ) Notice: Subject to any disclaimer, the term of this patent is extended or adjusted under 35 U.S.C. 154(b) by 217 days.

(21) Appl. No.: 13/615,758

(22) Filed: Sep. 14, 2012

(65) Prior Publication Data

US 2014/0015766 A1    Jan. 16, 2014

(30) Foreign Application Priority Data

Jul. 16, 2012   (TW) .............................. 101125474 A

(51) Int. Cl.
*G06F 3/041*      (2006.01)

(52) U.S. Cl.
USPC ............................... 345/173; 345/174; 345/55

(58) Field of Classification Search
CPC ....................................................... G06F 3/044
USPC .......................................... 345/173, 174, 55
See application file for complete search history.

(56) References Cited

U.S. PATENT DOCUMENTS

| | | | | |
|---|---|---|---|---|
| 8,520,295 | B2* | 8/2013 | Kornilovich | 359/296 |
| 2011/0007030 | A1* | 1/2011 | Mo et al. | 345/174 |
| 2012/0229414 | A1* | 9/2012 | Ellis | 345/174 |
| 2014/0015789 | A1* | 1/2014 | Yeh et al. | 345/174 |

* cited by examiner

*Primary Examiner* — Thuy Pardo
(74) *Attorney, Agent, or Firm* — Jackson IPG PLLC

(57) ABSTRACT

A touch unit includes multiple first axial electrodes and multiple second axial electrodes. The first axial electrodes extend in a first direction. Each first axial electrode includes multiple first sensing electrodes arranged in the first direction. Each first sensing electrode is formed with a hollow section and has a first extension end and a second extension end. The first and second extension ends defines therebetween a passageway in communication with the hollow section. Each second axial electrode includes multiple second sensing electrodes and multiple second connection lines. The second sensing electrodes are respectively disposed in the hollow sections. The second connection lines are connected with the second sensing electrodes and extend in a second direction through the passageways. By means of the design of the first and second axial electrodes, the manufacturing cost is effectively lowered and the total thickness of the touch unit is reduced.

7 Claims, 2 Drawing Sheets

US 8,917,254 B2

TOUCH UNIT

This application claims the priority benefit of Taiwan patent application number 101125474 filed on Jul. 16, 2012.

BACKGROUND OF THE INVENTION

1. Field of the Invention

The present invention relates generally to a touch unit, and more particularly to a touch unit, which has a greatly reduced thickness and is manufactured at lower cost.

2. Description of the Related Art

Along with the rapid development of information techniques and communication networks, various personal electronic information products have been more and more popularly used. To go with the tide, various touch panels have bee rapidly developed and applied to the electronic products. According to the sensing principle, the current touch panels can be mainly classified into resistive touch panels, capacitive touch panels, electromagnetic touch panels and optical touch panels. The capacitive touch panel structures have the advantages of dustproof, fireproof and high-resolution performances and are thus widely used. The working principle of the capacitive touch panel is that the touch point position is identified according to the change of capacitance. When a conductive touch article (such as a finger) gets close to the touch panel, the capacitance between the electrodes changes to identify the coordinates of the touch point.

The capacitive touch panels have gradually become the mainstream of touch techniques and are widely applied to various electronic information products nowadays, such as cellular phones, tablets, walkmans, handheld electronic devices, displays and monitors. The capacitive touch panel can detect the capacitance change caused by the weak current of human body to identify the positions of the finger and touch selection conditions so as to achieve the object of touch control.

Most of the conventional capacitive multipoint touch panels are double-board touch panels. The double-board touch panel is made of transparent conductive substrates by means of several times of halftone printing processes or lithography processes. The transparent conductive substrate are generally made of glass and coated with indium tin oxide (ITO) coatings. The unit price of the transparent conductive substrate is quite high. Moreover, in manufacturing, much material is wasted. In case that a defective product is produced in the manufacturing process, it is necessary to discard the entire touch panel without possibility of recovery. This results in waste of cost. Moreover, the touch panel is made of the transparent conductive substrates by means of several times of halftone printing processes or lithography processes. The transparent conductive substrates are respectively coated with the indium tin oxide (ITO) coatings. Such processes are complicated so that the manufacturing cost is greatly increased. Moreover, the double-board touch panel will increase the total thickness of the electronic device. This fails to meet the requirement for lightweight, slim and miniaturized structure of portable electronic device.

According to the above, the conventional touch panel has the following shortcomings:

1. The conventional touch panel has a larger thickness.
2. The manufacturing processes of the conventional touch panel are complicated. The manufacturing cost of the conventional touch panel is higher.

SUMMARY OF THE INVENTION

It is therefore a primary object of the present invention to provide a touch unit the total thickness of which is reduced. It is a further object of the present invention to provide the above touch unit the manufacturing cost of which is greatly lowered.

To achieve the above and other objects, the touch unit of the present invention includes: multiple first axial electrodes extending in a first direction, each first axial electrode including multiple first sensing electrodes connected with each other and arranged in the first direction, each first sensing electrode being formed with a hollow section in a central position, one end of the first sensing electrode having a first extension end extending in the first direction, the other end of the first sensing electrode having a second extension end extending in a direction reverse to the first direction, the first and second extension ends defining therebetween a passageway in communication with the hollow section; and multiple second axial electrodes, each second axial electrode including multiple second sensing electrodes and multiple second connection lines, the second sensing electrodes being respectively disposed in the hollow sections of the first sensing electrodes, one end of the second connection line being connected with the second sensing electrode and extending in a second direction through the passageway. By means of the design of the first and second axial electrodes, the manufacturing cost of the touch unit is effectively lowered and the total thickness of the touch unit is reduced.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
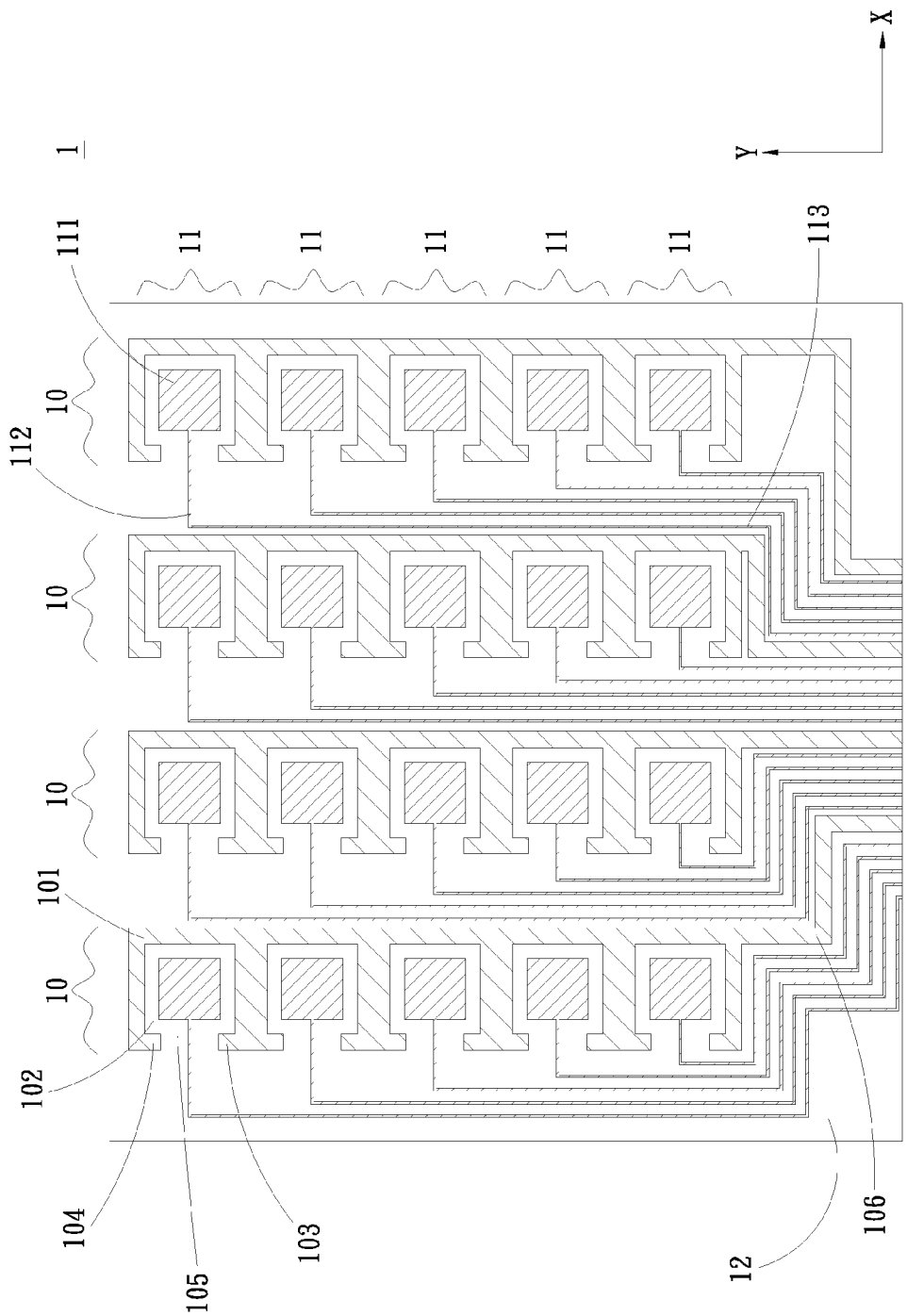
FIG. 1 is a plane view of a preferred embodiment of the touch unit 1 of the present invention.
Figure 2:
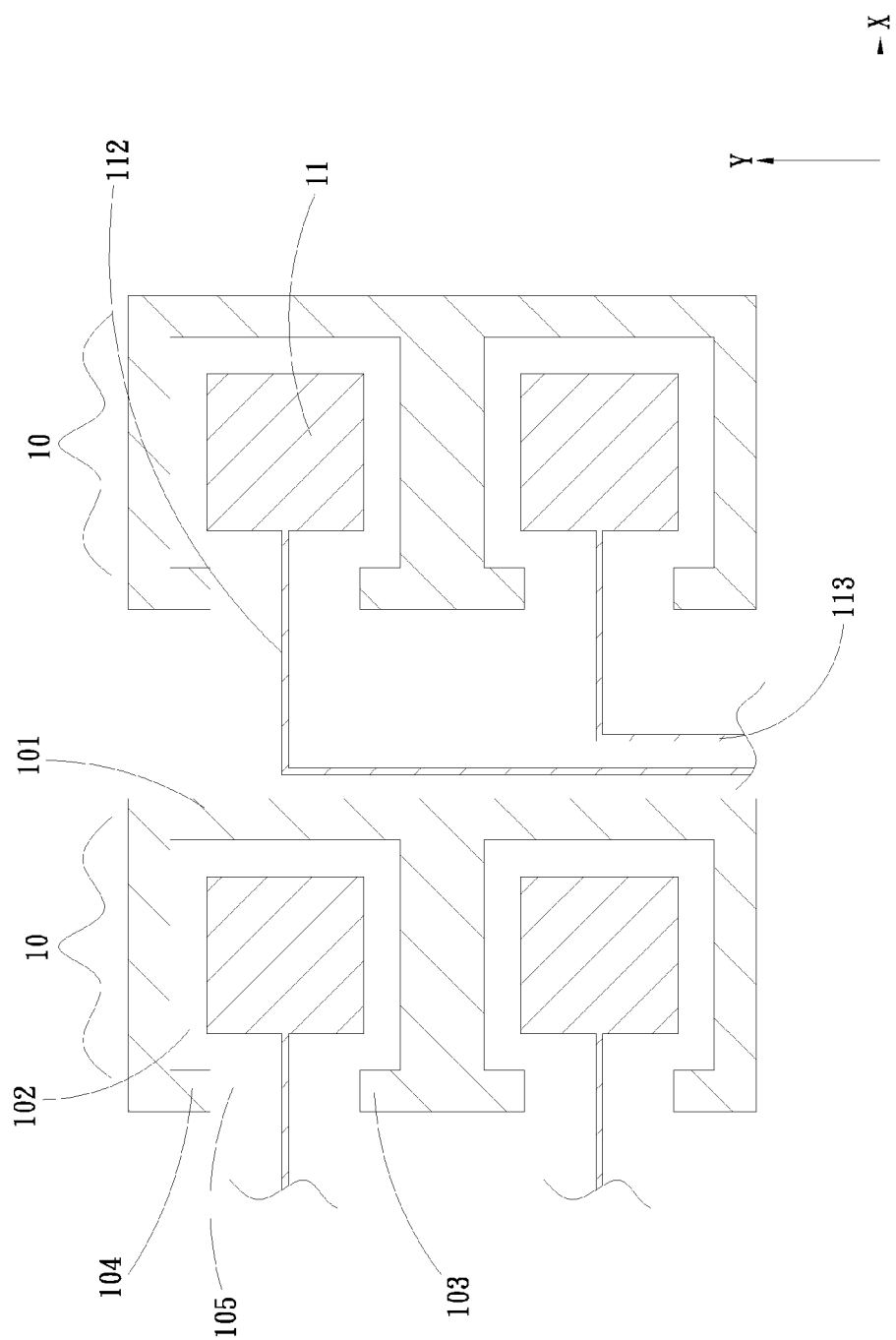
FIG. 2 is an enlarged view of a part of FIG. 1.

Please refer to FIGS. 1 and 2. FIG. 1 is a plane view of a preferred embodiment of the touch unit 1 of the present invention. FIG. 2 is an enlarged view of a part of FIG. 1. According to the preferred embodiment, the touch unit 1 of the present invention includes multiple first axial electrodes 10, multiple second axial electrodes 11 and a transparent substrate 12. The first and second axial electrodes 10, 11 are coated on the transparent substrate 12. In this embodiment, the material of the transparent substrate 12 is, but not limited to, glass for illustration purposes only. Alternatively, the material of the transparent substrate 10 can be selected from a group consisting of polyethylene terephthalate (PET), polycarbonate (PC), polyethylene (PE), polyvinyl chloride (PVC), polypropylene (PP), polystyrene (PS), polymethylmethacrylate (PMMA) and cyclo olefin copolymer (COC).

The material of the first and second axial electrodes 10, 11 is selected from a group consisting of indium tin oxide (ITO) coating, antimony tin oxide (ATO) coating and indium zinc oxide (IZO) coating. In this embodiment, the first and second axial electrodes 10, 11 are disposed on one side of the transparent substrate 12 by means of, but not limited to, sputtering deposition. In practice, the first and second axial electrodes 10, 11 can be alternatively disposed on the side of the transparent substrate 12 by means of gelatinization, electroplating or evaporation.

The first axial electrodes 10 extend in a first direction Y. In this embodiment, the first direction Y is Y axis. Each first axial electrode 10 includes multiple first sensing electrodes 101 connected with each other and arranged in the first direction Y. Each first sensing electrode 101 is substantially C-shaped and has a hollow section 102 in a central position. One end of the first sensing electrode 101 has a first extension end 103 extending in the first direction Y. The other end of the first sensing electrode 101 has a second extension end 104 extending in a direction reverse to the first direction Y. The first and second extension ends 103, 104 extend toward each other to define therebetween a passageway 105 in communication with the hollow section 102. The first axial electrode 10 further has a first axial connection line 106 extending in the first direction Y and connected with the first sensing electrodes 101.

Each second axial electrode 11 includes multiple second sensing electrodes 111 and multiple second connection lines 112. The second sensing electrodes 111 are respectively disposed in the hollow sections 102 of the first sensing electrodes 101. One end of the second connection line 112 is connected with the second sensing electrode 111 and extends in a second direction X through the passageway 105. In this embodiment, the second direction X is X axis. The second axial electrode 11 further includes multiple second axial connection lines 113. The second axial connection line 113 is connected with the other end of the second connection line 112. By means of the design of the first and second axial electrodes 10, 11 of the present invention, the manufacturing cost of the touch unit 1 can be effectively lowered and the total thickness of the touch unit 1 can be reduced.

As aforesaid, the first and second axial electrodes 10, 11 are coated on one side of the transparent substrate 12. In addition, a protection layer can be attached to the other side of the first and second axial electrodes 10, 11. The material of the protection layer is selected from a group consisting of silicon nitride (SiNx), silicon dioxide (SiO2) and silicon carbide (SiC). In this embodiment, the protection layer is a coating coated on one side of the first and second axial electrodes 10, 11, which side is opposite to the transparent substrate 12 by means of gelatinization, electroplating, evaporation, deposition or sputtering deposition for providing protection effect for the first and second axial electrodes 10, 11.

According to the above arrangement, in comparison with the conventional touch unit, the present invention has the following advantages:

1. The total thickness is reduced.
2. The manufacturing cost is lowered.

The present invention has been described with the above embodiments thereof and it is understood that many changes and modifications in the above embodiments can be carried out without departing from the scope and the spirit of the invention that is intended to be limited only by the appended claims.

What is claimed is:

1. A touch unit comprising:
   multiple first axial electrodes extending in a first direction, each first axial electrode including multiple first sensing electrodes connected with each other and arranged in the first direction, each first sensing electrode being formed with a hollow section in a central position, each first axial electrode having at least one first extension end extending in two opposite directions along the first direction and each end of each first axial electrode having a second extension end extending in a single direction along the first direction, adjacent first and second extension ends defining therebetween a passageway in communication with the hollow section, wherein each second extension end and a respective horizontal portion thereof are connected with the adjacent first extension end and a respective horizontal portion thereof; and
   multiple second axial electrodes, each second axial electrode including multiple second sensing electrodes, each having a square shape, and multiple respective second connection lines, the second sensing electrodes being respectively disposed in the hollow sections of the first sensing electrodes, one end of the second connection line being connected with the second sensing electrode and extending in a second direction through the passageway.

2. The touch unit as claimed in claim 1, wherein the first axial electrode further has a first axial connection line extending in the first direction and connected with the first sensing electrodes.

3. The touch unit as claimed in claim 1, wherein the second axial electrode further includes multiple second axial connection lines, the second axial connection line being connected with the other end of the second connection line.

4. The touch unit as claimed in claim 1, wherein the first and second axial electrodes are coated on a transparent substrate.

5. The touch unit as claimed in claim 4, wherein the material of the transparent substrate is selected from a group consisting of glass, polyethylene terephthalate (PET), polycarbonate (PC), polyethylene (PE), polyvinyl chloride (PVC), polypropylene (PP), polystyrene (PS), polymethylmethacrylate (PMMA) and cyclo olefin copolymer (COC).

6. The touch unit of claim 1, wherein each first axial electrode comprises a plurality of first extension ends, such that the first sensing electrodes at each end of each first axial electrode are defined by the respective second extension end and the adjacent first extension end and wherein a plurality of intermediate first sensing electrodes are defined by adjacent first extension ends.

7. The touch unit of claim 6, wherein, for each intermediate sensing electrode, the respective adjacent first extension ends and respective horizontal portions thereof are connected.

* * * * *